United States Patent
Bae et al.

(10) Patent No.: US 12,125,962 B2
(45) Date of Patent: Oct. 22, 2024

(54) BATTERY MANUFACTURING DEVICE AND MANUFACTURING METHOD OF BATTERY

(71) Applicant: LG CHEM, LTD., Seoul (KR)

(72) Inventors: Kwan Hong Bae, Daejeon (KR); Chan Woo Park, Daejeon (KR); Ji Sun Chung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 826 days.

(21) Appl. No.: 17/282,719

(22) PCT Filed: Mar. 16, 2020

(86) PCT No.: PCT/KR2020/003586
§ 371 (c)(1),
(2) Date: Apr. 2, 2021

(87) PCT Pub. No.: WO2020/189994
PCT Pub. Date: Sep. 24, 2020

(65) Prior Publication Data
US 2022/0006114 A1    Jan. 6, 2022

(30) Foreign Application Priority Data
Mar. 21, 2019  (KR) .................. 10-2019-0032583

(51) Int. Cl.
*H01M 50/528* (2021.01)
*H01M 10/04* (2006.01)
*H01M 50/533* (2021.01)
*H01M 4/02* (2006.01)

(52) U.S. Cl.
CPC ... *H01M 10/0404* (2013.01); *H01M 10/0422* (2013.01); *H01M 10/0431* (2013.01); *H01M 50/528* (2021.01); *H01M 50/533* (2021.01); *H01M 2004/028* (2013.01)

(58) Field of Classification Search
CPC ......... H01M 10/0404; H01M 10/0422; H01M 10/0431; H01M 50/528; H01M 50/533
See application file for complete search history.

(56) References Cited

U.S. PATENT DOCUMENTS

2005/0147878 A1  7/2005  Miyahisa et al.
2018/0076442 A1  3/2018  Choi et al.

FOREIGN PATENT DOCUMENTS

| CN | 103050735 A | 4/2013 |
|---|---|---|
| CN | 203592237 U | 5/2014 |
| CN | 107810569 A | 3/2018 |

(Continued)

OTHER PUBLICATIONS

International Search Report for PCT/KR2020/003586 (PCT/ISA/210) mailed on Jun. 30, 2020.

(Continued)

*Primary Examiner* — James Lee
(74) *Attorney, Agent, or Firm* — Birch, Stewart, Kolasch & Birch, LLP

(57) ABSTRACT

A battery manufacturing device for manufacturing a cylindrical battery by folding a positive electrode tab connected to a top cap includes a jig that makes a pendulum swing and presses a positive electrode tab; an adjusting member that forms a turning radius of the pendulum swing; and a folding knife that presses a folding part of the positive electrode tab. A method of using the battery manufacturing device is also provided.

15 Claims, 4 Drawing Sheets

(56) References Cited

FOREIGN PATENT DOCUMENTS

| JP | 9-35739 A | 2/1997 |
|----|-----------|--------|
| JP | 10-233228 A | 9/1998 |
| JP | 10-270007 A | 10/1998 |
| JP | 11-176464 A | 7/1999 |
| JP | 4507481 B2 | 7/2010 |
| JP | 2012-99317 A | 5/2012 |
| JP | 2016-154138 A | 8/2016 |
| KR | 10-2009-0027321 A | 3/2009 |
| KR | 10-1050345 B1 | 7/2011 |
| KR | 10-1318570 B1 | 10/2013 |
| KR | 10-2016-0007109 A | 1/2016 |
| KR | 10-2018-0107859 A | 10/2018 |

OTHER PUBLICATIONS

Extended European Search Report for European Application No. 20774248.7 dated Jan. 11, 2022.

[FIG. 1]
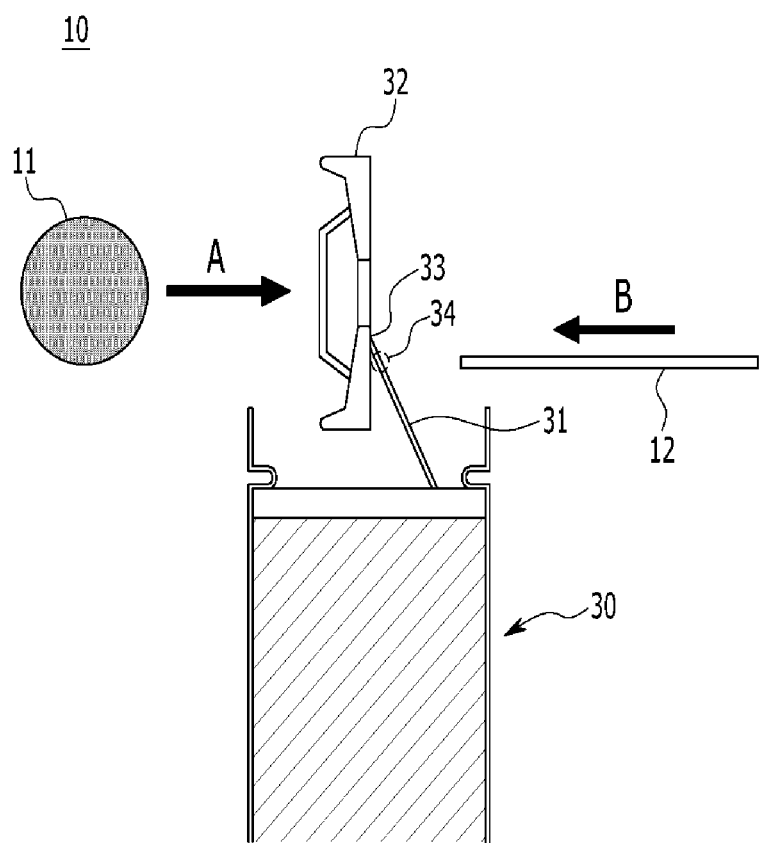

[FIG. 2]
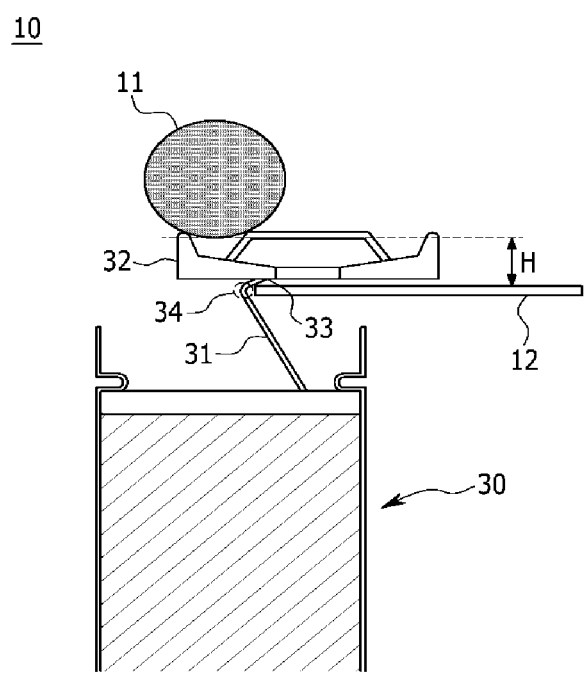

[FIG. 3]
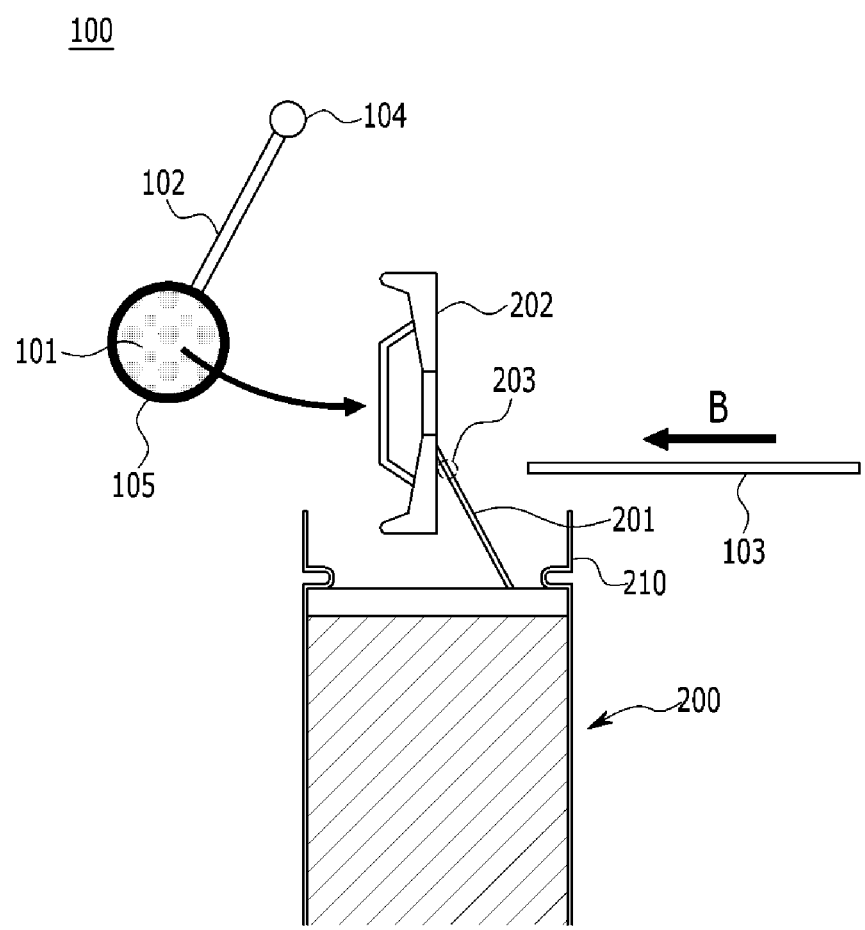

[FIG. 4]
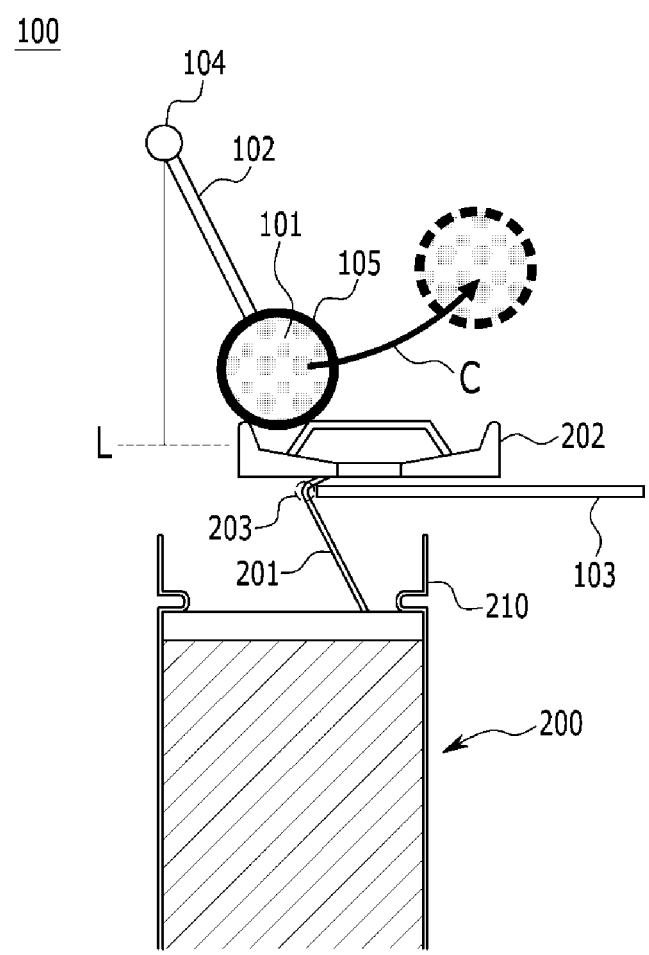

BATTERY MANUFACTURING DEVICE AND MANUFACTURING METHOD OF BATTERY

CROSS-CITATION WITH RELATED APPLICATION(S)

This application claims the benefit of Korean Patent Application No. 10-2019-0032583 filed on Mar. 21, 2019 with the Korean Intellectual Property Office, the disclosure of which is incorporated herein by reference in its entirety.

The present disclosure relates to a battery manufacturing device and a manufacturing method of a battery.

TECHNICAL FIELD

Background Art

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, the demand for batteries as energy sources is rapidly increasing as mobile device technology continues to develop and the demand for such mobile devices continues to increase. Accordingly, much research on batteries capable of satisfying various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

Secondary batteries may be classified based on the structure of an electrode assembly having a structure in which a positive electrode and a negative electrode are stacked in the state in which a separator is interposed between the positive electrode and the negative electrode. For example, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which pluralities of positive electrodes and negative electrodes each having a predetermined size are sequentially stacked in the state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in the state in which separators are disposed respectively between the positive electrodes and the negative electrodes to constitute a unit cell, after which a plurality of unit cells is sequentially folded in the state of having been placed on a separation film.

These electrode assemblies are accommodated in a pouch case, a cylindrical can, a prismatic case, etc. depending on the purpose of use to produce a battery.

Among them, the cylindrical battery has the advantages of being easy to manufacture and having a high energy density per weight, and thus, is used as an energy source for various devices ranging from portable computers to electric vehicles.

FIG. 1 is a schematic view showing folding of a positive electrode tab using a conventional device for manufacturing a cylindrical battery pack. FIG. 2 is a schematic view showing that a top cap is sandwiched between a jig and a knife in FIG. 1.

Referring to FIGS. 1 and 2, the conventional cylindrical battery manufacturing device 10 uses a jig 11 and a folding knife 12 to fold a positive electrode tab 31 of a cylindrical battery 30. The positive electrode tab 31 is welded to a connection part 33 of the top cap 32. While moving the jig 11 located on one side of the top cap 32 in the first direction A to press the top cap 32, the folding knife 12 located on the other side of the top cap 32 is moved in the second direction B to press a folding part 34. At this time, the jig 11 and the folding knife 12 move in parallel with each other in a state of being spaced apart by a predetermined interval H.

However, when the jig 11 and the folding knife 12 move in parallel, a sandwiching phenomenon of the top cap 32 occurs between the jig 11 and the folding knife 12, which causes problem that not only the outer shape of the cylindrical battery 30 is damaged but also a malfunction of the cylindrical battery manufacturing device 10 is induced.

DETAILED DESCRIPTION OF THE INVENTION

Technical Problem

It is an object of the present disclosure to provide a battery manufacturing device and a manufacturing method of a battery which can minimize damage to an electrode tab and malfunction of a battery manufacturing equipment.

However, the problem to be solved by the embodiments of the present disclosure is not limited to the above-described problems, and can be variously expanded within the scope of the technical idea included in the present disclosure.

Technical Solution

According to an embodiment of the present disclosure, there is provided a battery manufacturing device for manufacturing a cylindrical battery by folding a positive electrode tab connected to a top cap, the positive electrode tab having a folding part, the battery manufacturing device comprising: a jig that is configured to make a pendulum swing to press the top cap; an adjusting member that defines a turning radius of the pendulum swing; and a folding knife configured to press the folding part of the positive electrode tab.

The adjusting member may determine a position of a bottom dead center of the jig by adjusting a length of the adjusting member.

The jig can make contact with the top cap at the bottom dead center.

After the jig makes contact with the top cap at the bottom dead center, a gap between the jig and the folding knife may be increased as the jig continues the pendulum swing.

A first end of the adjusting member may be connected to a fixing member.

A second end of the adjusting member may be connected to the jig.

The jig can make a pendulum swing around the fixing member.

The folding knife may move horizontally to press the folding part of the positive electrode tab.

The jig may include an elastic member on a surface of the jig.

The folding knife may be formed of a high-functional resin.

The high-functional resin may be polyetheretherketone.

The present disclosure also provides a battery manufacturing method for manufacturing the cylindrical battery using the above-mentioned battery manufacturing device.

The method may include electrically connecting the positive electrode tab to the top cap of the cylindrical battery.

The method may include adjusting a length of an adjusting member connected to a jig located on one side of the top cap, thereby adjusting a bottom dead center position of the jig.

The method may include subjecting the jig to a pendulum swing to press the top cap.

The method may include horizontally moving the folding knife located on another side of the top cap to press the folding part of the positive electrode tab.

The method may further include fixing a first end of the adjusting member to the fixing member.

The method may further include pressing the top cap in a state in which the jig is in contact with the top cap at the bottom dead center.

The method may further include increasing a gap between the jig and the folding knife after the jig makes contact with the top cap at the bottom dead center and continues with the pendulum swing.

Advantageous Effects

As described above, the battery manufacturing device according to the embodiment of the present disclosure can include a jig for making a pendulum swing and an adjusting unit for adjusting the bottom dead center position of the jig, thereby preventing a sandwiching phenomenon of the top cap between the jig and the folding knife.

BRIEF DESCRIPTION OF THE DRAWINGS

FIG. 1 is a schematic view showing folding of a positive electrode tab using a conventional device for manufacturing a cylindrical battery pack.

FIG. 2 is a schematic view showing that a top cap is sandwiched between a jig and a knife in FIG. 1.

FIG. 3 is a schematic view showing a battery manufacturing device according to an embodiment of the present disclosure.

FIG. 4 is a schematic view showing an operation state of the jig when the battery manufacturing device of FIG. 3 is used.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

Further, throughout the specification, when referring to "horizontal", it means a direction parallel to the ground.

FIG. 3 is a schematic view showing a battery manufacturing device according to an embodiment of the present disclosure. FIG. 4 is a schematic view showing an operation state of the jig when the battery manufacturing device of FIG. 3 is used.

Referring to FIG. 3, the battery manufacturing device 100 may include a jig 101, an adjusting unit 102, and a folding knife 103. The jig 101 may be located on one side of the top cap 202 in the cylindrical battery 200, and the folding knife 103 may be located on the other side of the top cap 202. Further, the jig 101 may be connected to the adjusting unit 102.

The jig 101 may be connected to one side of the adjusting unit 102, and the other side of the adjusting unit 102 may be connected to the fixing unit 104. The jig 101 may make a pendulum swing when pressing the top cap 202. Here, the "pendulum swing" means that the jig 101 swings like a pendulum around the fixing unit 104.

The shape of the jig 101 is not particularly limited, but may be a circular sphere or a cylindrical shape so that a contact surface between the jig 101 and the top cap 202 can be minimized when the jig 101 makes a pendulum swing and presses the top cap 202. Since the positive electrode tab 201 is generally made of a metal material having excellent ductility and has a long band shape compared to the width, it does not require a high pressing force to fold the positive electrode tab 201. Therefore, even if the jig 101 is formed in a circular sphere or a cylindrical shape, it is possible to transmit a sufficient pressing force to fold the positive electrode tab 201 to the positive electrode tab 201. By such a structure, it is possible to minimize a contact surface between the jig 101 and the top cap 202, so that the appearance of the top cap 202 is not damaged when the jig 101 presses the top cap 202.

Referring to FIG. 4, the adjusting unit 102 may connect the fixing unit 104 and the jig 101 and form a turning radius in which the jig 101 makes a pendulum swing. The adjusting unit 102 may adjust the length of the adjusting unit 102 to adjust the position of the bottom dead center L. Here, the bottom dead center L means a point closest to the ground in the trajectory where the jig 101 makes a pendulum swing. The position where the jig 101 makes contact with the top cap 202 may be determined depending on the position of the bottom dead center L.

When the jig 101 makes a pendulum swing and presses the top cap 202 in a state of being in contact with the top cap 202 of the cylindrical battery 200, the folding knife 103 may horizontally move along the second direction B shown in FIG. 3 to press the folding part 203 in a state of being in contact with the folding part 203 of the positive electrode tab 201. By this structure, the positive electrode tab 201 can be folded only at the folding part 203.

The shape of the folding knife 103 is not particularly limited, but as an example, it may be a long band shape compared to the width. Then, in order to prevent the folding part 203 of the positive electrode tab 201 from being damaged by the folding knife 103, the end part of the folding knife 103 making contact with the folding part 203 may be processed into a round shape.

The folding knife 103 be formed of materials that do not change physically and chemically, even after repeated contact with the electrolyte inside the positive electrode tab 201 and the cylindrical battery 200. As an example, the folding knife 103 may be formed of a metal such as stainless steel. In this case, since the folding knife 103 has excellent durability, the folding part 203 of the positive electrode tab 201 can be pressed at a predetermined pressure without physical deformation.

In addition, the folding knife 103 may be formed of a high-functional resin such as polyetheretherketone. The polyetheretherketone is a semi-crystalline resin that does not dissolve even in an organic solvent, and has excellent chemical resistance as well as high strength, so that the folding part 203 of the positive electrode tab 201 can be pressed at a predetermined pressure. In addition, when using the folding knife 103 formed of a high-functional resin, it can prevent metal foreign matters generated in the folding process from flowing into the cylindrical battery 200.

The jig 101 makes contact with the top cap 202 at the bottom dead center (L) and can move in the third direction C according to the pendulum swing trajectory. Here, the "third direction" means the opposite direction in which gravity acts on the ground. Because of such a structure, a gap between the jig 101 and the folding knife 103 increases after the jig 101 makes contact with the top cap 202 at the bottom dead center L. Therefore, it is possible to prevent the top cap 202 from being sandwiched between the jig 101 and the folding knife 103. Moreover, since the positive electrode tab 201 can be folded at a desired angle in the folding part 203, the positive electrode tab 201 may make contact with a metal can 210 to prevent a short circuit from occurring.

The jig 101 may include an elastic member 105 on its surface. The elastic member 105 can prevent the outer shape of the top cap 202 from being damaged when the jig 101 presses the top cap 202.

The present disclosure provides a method of manufacturing a cylindrical battery 200 using the battery manufacturing device 100.

The method may include electrically connecting the positive electrode tab 201 to the top cap 202 of the cylindrical battery 200. An operator may connect the positive electrode tab 201 to the top cap 202 using resistance welding, laser welding, or the like.

And, the method may include connecting one side of the adjusting unit 102 to the fixing unit 104.

And, the method may include adjusting the length of the adjusting unit 102 connected to the jig 101 located on one side of the top cap 202, thereby adjusting the position of the bottom dead center L. The operator can adjust the position of the bottom dead center L in consideration of the turning radius of the jig 101 and the position of the folding knife 103.

And, the method may include subjecting the jig 101 to a pendulum swing to press the top cap 202. The operator can appropriately adjust the speed at which the jig 101 moves so as to press the top cap 202 in a state where the jig 101 is in contact with the top cap 202 at the bottom dead center L. In addition, the operator can prevent the outer shape of the top cap 202 from being deformed by appropriately adjusting the pressure at which the jig 101 presses the top cap 202.

Further, the method may include pressing the folding part 203 of the positive electrode tab 201 by horizontally moving the folding knife 103 located on the other side of the top cap 202. When the jig 101 makes a pendulum swing and makes contact with the top cap 202, the operator can make the positive electrode tab 201 foldable at the folding part 203 so that the folding knife 103 also reaches the folding part 203.

Further, the method may include increasing a gap between the jig 101 and the folding knife 103 after the jig 101 makes contact with the top cap 202 at the bottom dead center L.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims.

The invention claimed is:

1. A battery manufacturing device for manufacturing a cylindrical battery by folding a positive electrode tab connected to a top cap, the positive electrode tab having a folding part, the battery manufacturing device comprising:
   a jig configured to make a pendulum swing to press the top cap;
   an adjusting member that defines a turning radius of the pendulum swing; and
   a folding knife configured to press the folding part of the positive electrode tab.

2. The battery manufacturing device according to claim 1, wherein the adjusting member determines a position of a bottom dead center of the jig by adjusting a length of the adjusting member.

3. The battery manufacturing device according to claim 2, wherein the jig is configured to make contact with the top cap at the bottom dead center.

4. The battery manufacturing device according to claim 3, wherein, after the jig makes contact with the top cap at the bottom dead center, a gap between the jig and the folding knife increases as the jig continues the pendulum swing.

5. The battery manufacturing device according to claim 1, wherein a first end of the adjusting member is connected to a fixing member.

6. The battery manufacturing device according to claim 5, wherein a second end of the adjusting member is connected to the jig.

7. The battery manufacturing device according to claim 5, wherein the jig is configured to make a pendulum swing around the fixing member.

8. The battery manufacturing device according to claim 1, wherein the folding knife is configured to move horizontally to press the folding part of the positive electrode tab.

9. The battery manufacturing device according to claim 1, wherein the jig includes an elastic member on a surface of the jig.

10. The battery manufacturing device according to claim 1, wherein the folding knife is formed of a resin.

11. The battery manufacturing device according to claim 10, wherein the resin is polyetheretherketone.

12. A battery manufacturing method comprising the steps of:
    electrically connecting a positive electrode tab to a top cap of a cylindrical battery;
    adjusting a length of an adjusting member connected to a jig located on one side of the top cap to adjust a bottom dead center position of the jig;
    subjecting the jig to a pendulum swing to press the top cap; and
    horizontally moving a folding knife located on another side of the top cap opposite to the jig to press a folding part of the positive electrode tab.

13. A battery manufacturing method according to claim 12, further comprising fixing a first end of the adjusting member to a fixing member prior to subjecting the jig to the pendulum swing to press the top cap.

14. The battery manufacturing method according to claim 12, wherein the jig presses the top cap in a state in which the jig makes contact with the top cap at the bottom dead center.

15. The battery manufacturing method according to claim 12, further comprising increasing a gap between the jig and the folding knife after the jig makes contact with the top cap at the bottom dead center and continues with the pendulum swing.

* * * * *